US007356842B2

(12) United States Patent  (10) Patent No.: US 7,356,842 B2
Canard et al.  (45) Date of Patent: Apr. 8, 2008

(54) CRYPTOGRAPHIC REVOCATION METHOD USING A CHIP CARD

(75) Inventors: Sébastien Canard, Caen (FR); Marc Girault, Caen (FR); Jacques Traore, St. Georges des Groseillers (FR)

(73) Assignee: France Telecom, Paris (FR)

( * ) Notice: Subject to any disclaimer, the term of this patent is extended or adjusted under 35 U.S.C. 154(b) by 368 days.

(21) Appl. No.: 10/501,823

(22) PCT Filed: Jan. 15, 2003

(86) PCT No.: PCT/FR03/00112

§ 371 (c)(1),
(2), (4) Date: Dec. 28, 2004

(87) PCT Pub. No.: WO03/060841

PCT Pub. Date: Jul. 24, 2003

(65) Prior Publication Data
US 2005/0097336 A1    May 5, 2005

(30) Foreign Application Priority Data
Jan. 17, 2002  (FR) .................................. 02 00569

(51) Int. Cl.
  *H04L 9/00* (2006.01)
(52) U.S. Cl. .......................... 726/20; 713/172
(58) Field of Classification Search .......... 726/9; 713/158
  See application file for complete search history.

(56) References Cited

U.S. PATENT DOCUMENTS 3,696,335 A   10/1972 Lemelson
4,734,564 A    3/1988 Boston et al.
5,191,193 A *  3/1993 Le Roux ................. 235/379
6,715,078 B1 * 3/2004 Chasko et al. ............ 713/193
7,085,931 B1 * 8/2006 Smith et al. .............. 713/182

FOREIGN PATENT DOCUMENTS

EP      0 378 349 A2   1/1990
WO      WO 00/08610    2/2000

OTHER PUBLICATIONS

Knuth, "Art of Computer Programming", vol. 3. Sorting and Searching, Addison-Wesley, pp. 559-563, 1973.
J. Camenisch et al., "Efficient Group Signature Schemes for Large Groups", Advances in Cryptology, CRYPTO 97, vol. 1296 of LNCS, pp. 410-424, Springer-Verlag 1997.
E. Bresson et al., "Efficient Revocation in Group Signatures", Public Key Cryptography—PKC 2001, vol. 1992 of LNCS, pp. 190-206, Springer-Verlag 2001.
H.J. Kim et al., "Efficient and Secure Member Deletion in Group Signature Schemes", Information Security and Cryptology—ICISC 2000, vol. 2015 of LNCS, Springer-Verlag pp. 150-161.
J. Camenisch et al., "A Group Signature Scheme with Improved Efficiency", Advances in Cryptology, ASIACRYPT '98, vol. 1514 of LNCS, Springer-Verlag pp. 160-174, 1998.

* cited by examiner

*Primary Examiner*—Nasser Moazzami
*Assistant Examiner*—Daniel L Hoang
(74) *Attorney, Agent, or Firm*—Cohen Pontani Lieberman & Pavane LLP

(57) ABSTRACT

A cryptographic method and a chip card which is used to carry out the method. Before any calculation is performed by a computing means of the chip card, the chip card reads (2) an integral list, in a storage means of a second entity, of identifiers of first proprietary entities of a chip card. Such list is linked to each status assigned to each of the first entities by the second entity. Subsequently, the chip card compares (3) the identifier stored in a storage means of the chip card with the contents of the list, in order to authorize (5) or prohibit (4) any calculation by the computing means depending on the result of the comparison.

5 Claims, 5 Drawing Sheets

CRYPTOGRAPHIC REVOCATION METHOD USING A CHIP CARD

RELATED APPLICATIONS

This is a U.S. National Phase Application under 35 USC 371 of International Application PCT/FR03/00112, Filed: 15 Jan. 2003.

1. Field of the Invention

The present invention relates to the field of telecommunications and more particularly to securing transmissions, in particular for services, using cryptography.

2. Description of the Prior Art

Electronic signature mechanisms have been developed for authenticating the source of a document transmitted via telecommunications means. It should be noted that the term "transmission in electronic form" is routinely used to refer to the transmission of a document via telecommunications means. In the context of the invention, the documents in question are necessarily in digital form, as opposed to paper form; the term "message" as used in the remainder of this application refers to this type of document. The most widely used electronic signature mechanisms are based on public key cryptographic techniques that rely on an entity known as a trusted authority. The trusted authority usually generates certificates on behalf of users of standard public key methods; these certificates establish a connection between a public key and the identity of the proprietor of the key. To use this kind of method, the person signing the message must first obtain certification from the trusted authority by communicating to the authority at least his public key and his identity. The method calculates an electronic signature for the message taking account of the content of the message and of the person's private key. The signatory sends the message, the signature and his certificate to the addressee of the message, who verifies the electronic signature of the message using at least the public key and the content of the message. For some applications, such as electronic voting, electronic bidding or anonymous electronic payments, it is necessary to use an anonymous electronic signature. An anonymous electronic signature has the same characteristics as an ordinary electronic signature except that the addressee cannot determine the identity of the signatory, who remains anonymous. However, the addressee is able to contact the trusted authority, which is able to remove the anonymity by referring to the certificate. The anonymous group signature is one particular type of anonymous signature. An anonymous group signature scheme enables each member of a group to produce an electronic signature that is characteristic of the group. The addressee of a message accompanied by an anonymous group signature is able to verify that the signature was applied by one of the members of the group but is not able to determine which of the members of the group this was.

In the context of the invention, a group is a set of persons who declare themselves to an authority as belonging to the same group. At the time of this declaration, each person interacts with the trusted authority using a particular protocol, after which the person obtains a private key which is associated with a public key of the group previously determined by the trusted authority, and the authority and the person obtain an identifier of the person associated with the private key. In the remainder of this application, each person is referred to as a member. One example of a protocol of this kind is described in the paper by J. Camenisch and M. Michels "Efficient Group Signature Schemes For Large Groups", in B. Kaliski, editor, Advances In Cryptology—CRYPTO97, Volume 1296 of LNCS, pages 410 to 424, Springer-Verlag, 1997. The same interaction occurs upon the arrival of a new member. From the point of view of the trusted authority, the existence of a group is reflected by assigning a group public key to the group and assigning a different private key to each member, each private key being associated with the public key and an identifier. Using his private key, a member is able to apply an anonymous group signature to a message of his choice. Any addressee is able to verify that the signature was in fact applied by one of the members of the group, provided that the group public key was used. After verification, the addressee is certain either that the signature was applied by a member of the group or that it was not, as the case may be, but obtains no information as to the identity of that member; the signature is anonymous. However, the addressee may contact the trusted authority, which is able to determine the identity of the signatory from the encrypted identifier, by means of a public key of the trusted authority, which accompanies the group anonymous signature. Thus the trusted authority is able to remove the anonymity at any time.

A group may evolve after it has been set up by the trusted authority. A first type of change is for new persons to become members of the group. A second type of change, referred to as revocation, is for members to leave the group or to be excluded from the group. Each time the group changes, the trusted authority is faced with the problem of assigning to or withdrawing from a member of the group the means for applying a group anonymous signature. The first problem that arises relates to assigning a new member the means for applying a group anonymous signature, and is solved using one of the prior art public key/private key generation algorithms that associate as many private keys as necessary with the same public key. One example of this kind of algorithm is described in the paper by J. Camenisch and M. Michels "Efficient Group Signature Schemes For Large Groups", in B. Kaliski, editor, Advances In Cryptology—CRYPTO97, Volume 1296 of LNCS, pages 410 to 424, Springer-Verlag, 1997.

Prior Art

The second problem that arises relates to withdrawing these means from a person, and is solved by various prior art revocation methods.

A first of these methods is described in the paper by E. Bresson and J. Stern "Efficient Revocation In Group Signatures", in K. Kim, editor, Public Key Cryptography—PKC 2001, Volume 1992 of LNCS, pages 190-206, Springer-Verlag, 2001. This method is based on the fact that each member of a group has his own identifier. Given that the signature must remain anonymous, it is not possible to reveal this identifier. However, in that method, the identifier of the signatory is divided by the identifier of each revoked member; the result of each division is different from 1 if, and only if, the signatory is not a revoked member. Using an encryption algorithm, each of the results of these divisions is then encrypted and the encrypted result is sent to the addressee, accompanied by particular elements. The addressee uses the particular elements and the encrypted results to verify that the divisions have been effected correctly and that all the results are different from 1, which confirms that the signature was applied by a non-revoked member.

Given that there are as many encrypted results and particular elements as there are revoked members, this method has the drawback of generating a group anonymous signature whose length and calculation time increase in proportion to the number of revoked members.

A second revocation method is described in the paper by H. J. Kim, J. I. Lim and D. H. Lee "Efficient And Secure Member Deletion In Group Signature Schemes", in D. Won, editor, Information Security And Cryptology—ICISC 2000, Volume 2015 of LNCS, pages 150 et seq., Springer-Verlag, 2000. That method uses three keys in addition to the keys necessary for a successful group signature scheme, namely an ownership private key for each member, an ownership public key to enable each member to verify the validity of his key, and a renewal public key to enable each member to modify his ownership private key each time that a member joins or leaves the group. The trusted authority modifies the ownership public key and the renewal key for each new member and for each revocation of a member. Each remaining member of the group modifies his ownership private key using the renewal key and verifies its validity using the ownership public key. To sign a message electronically, the signatory member uses his ownership private key. Thus the addressee is able to verify the electronic signature using the ownership public key. This method has the drawback of being of specific application in that it has proven to be secure only in a particular group signature scheme that corresponds to the one described in the paper by J. Camenisch and M. Michels "A Group Signature Scheme With Improved Efficiency", in K. Ohta and D. Pei, editors, Advances In Cryptology—ASIACRYPT'98, Volume 1514 of LNCS, pages 160-174, Springer-Verlag, 1998. Furthermore, that method has the disadvantage that it imposes calculations on each member each time that a member joins or leaves the group; those calculations may become frequent if the dynamics of the group are particularly intense.

One objective of the invention is to remove the drawbacks of the prior art methods described above.

SUMMARY OF THE INVENTION

To this end, the present invention provides a cryptographic method implemented by a smart card of a set of smart cards each belonging to a first entity that may be different for each smart card, each smart card being equipped with a chip comprising storage means in which are stored a secret key and an identifier of the first entity that is the proprietor of the smart card and calculation means which execute a cryptographic algorithm whose input arguments include at least the secret key. The cryptographic method of the invention comprises the following steps:

before any calculation by the calculation means of the chip of the smart card, the chip reads in storage means of a second entity a list of identifiers in complete form of first entities that are smart card proprietors, said list being linked to each status assigned to each of the first entities by the second entity, and the chip compares the identifiers stored in the storage means of the chip and the contents of the list to authorize or prohibit calculation by the calculation means as a function of the result of the comparison.

The invention further provides a smart card for implementing the above kind of method.

The method of the invention involves using the chip on the smart card to prohibit any cryptographic calculation implemented in the chip if the status of the proprietor of the smart card is set to "revoked" by the second entity. Otherwise, the status of the proprietor of the smart card is set to "non-revoked" and the chip authorizes the calculation. The second entity, which is typically a trusted authority, maintains an updated list of the identifiers of each smart card proprietor, whose status is either revoked or non-revoked.

The second entity stores this list in storage means connected to a telecommunications network. The smart card may access those storage means via a smart card reader associated with a computer, such as a personal computer, connected to the telecommunications network.

Thus a revoked member is not able to carry out any cryptographic calculation. If the cryptography algorithm installed in the chip is an anonymous signature calculation algorithm, the proprietor of the smart card is not able to use his smart card to sign a file if he has been revoked.

The method of the invention may be implemented in particular ways; some implementations are listed below, although the following list is not to be regarded as exhaustive.

In one particular embodiment, the list comprises the identifiers of revoked entities, in which case the list is called a black list.

In another embodiment, the list comprises the identifiers of non-revoked entities, in which case the list is called a white list.

In another embodiment, the list is signed by the second entity, which calculates the signature using a signature algorithm, which may be an asymmetric public key algorithm, such as the RSA algorithm (RSA are the first letters of the surnames of the inventors of the algorithm). Before authorization, the chip verifies the validity of the signature. In the case of a public key signature algorithm, the chip verifies the signature by means of the same asymmetric algorithm and using the public key as an input argument. This verification authenticates the entire list and therefore verifies its integrity.

In another embodiment, each identifier from the list is associated with a count value and each set formed of the identifier and the associated count value is signed by the second entity. The list comprises a value for the number of identifiers in the list and a signature for that value. Each signature is calculated in the same way as in the previous embodiment. Before authorization, the chip verifies the validity of each signature. This verification authenticates each identifier from the list, the associated count value and the read value of the number of identifiers. The chip also increments a counter each time an identifier is read, taking account of the count value associated with the read identifier, and then compares the counter to the authenticated value before authorizing calculation by the chip. This comparison verifies the integrity of the number of read identifiers.

Other features and advantages of the invention become apparent in the course of the following description, which is given with reference to the appended drawings, which show embodiments of the invention by way of non-limiting example.

DETAILED DESCRIPTION OF EMBODIMENTS OF THE INVENTION

Figure 1:
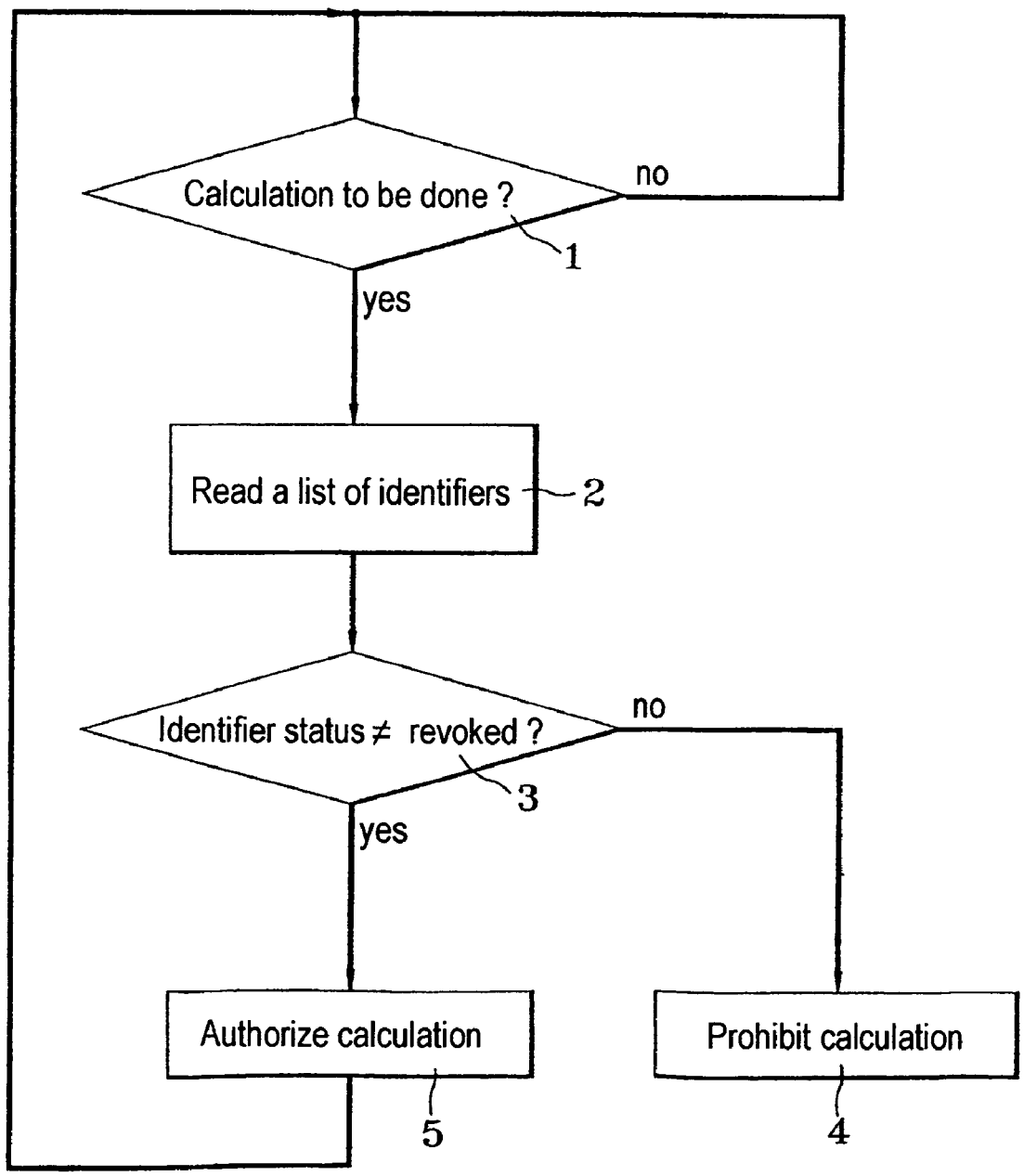
FIG. 1 is a flowchart of a cryptographic method of the invention.

The method is implemented by a smart card of a set of smart cards each of which belongs to a first entity. The first entity, typically a physical person, may be different for each smart card. Each smart card is equipped with a microchip that comprises storage means and calculation means. A secret key and an identifier of the first entity that is the proprietor of the smart card are stored in the storage means. A cryptographic algorithm whose input arguments include the secret key is implemented in the calculation means.

The cryptographic algorithm may be a group signature calculation algorithm, an encryption algorithm, or a decryption algorithm.

One example of a group signature calculation algorithm is described in the paper by J. Camenisch and M. Stadler "Efficient group signature schemes for large groups", in B. Kaliski, editor, Advances in Cryptology—CRYPT097, Volume 1296 of LNCS, pages 410 to 424, Springer-Verlag, 1997. Another description is given in the paper by J. Camenisch and M. Michels "A group signature scheme with improved efficiency", in K. Ohta and D. Pei, editors, Advances in Cryptology—ASIACRYPT'98, Volume 1514 of LNCS, pages 160-174, Springer-Verlag, 1998. The RSA algorithm may be used as an encryption/decryption algorithm.

The method comprises a plurality of steps described below. For signing, encrypting or decrypting, the chip activates the calculation means, which calculate output data as a function of input arguments presented to the input of the cryptographic algorithm.

Prior to any calculation 1 by the calculation means of the chip in the smart card, the chip reads a list of identifiers in complete form of first entities that are smart card proprietors. This list is stored in storage means of a second entity (operation 2). In an entirely equivalent manner, a list read in the storage means of a second entity may be written to the chip. Any reading operation referred to in the remainder of the description may be replaced in an entirely equivalent manner by a writing operation. The list is linked to the status assigned to each of the first entities by the second entity. The second entity sets this status to "revoked" or "non-revoked". The list contains either the first entities that have been revoked, in which case it is called a black list, or the first entities that have not been revoked, in which case it is called a white list. The second entity stores this list in storage means accessible via a telecommunications network. The storage means may comprise memory space on a server or on a mass storage device, for example.

The chip then compares the identifier stored in the storage means of the chip and the content of the list (operation 3). If, following this comparison, the chip finds that the first entity has been revoked, it prohibits calculation by the calculation means (operation 4). But if, following this comparison, the chip finds that the first entity has not been revoked, it authorizes calculation by the calculation means (operation 5).

The method used by a chip to carry out the above comparison is as follows. The chip initializes a flag to 1. It compares each identifier read in succession to the identifier stored in the chip; if they are not identical, the chip sets the flag to 1; if they are identical it sets the flag to 0. After comparing each read identifier and the identifier stored in the chip, the chip prohibits calculation by the calculation means if the flag is at 1 and authorizes calculation by the calculation means if the flag is at 0.

Figure 2:
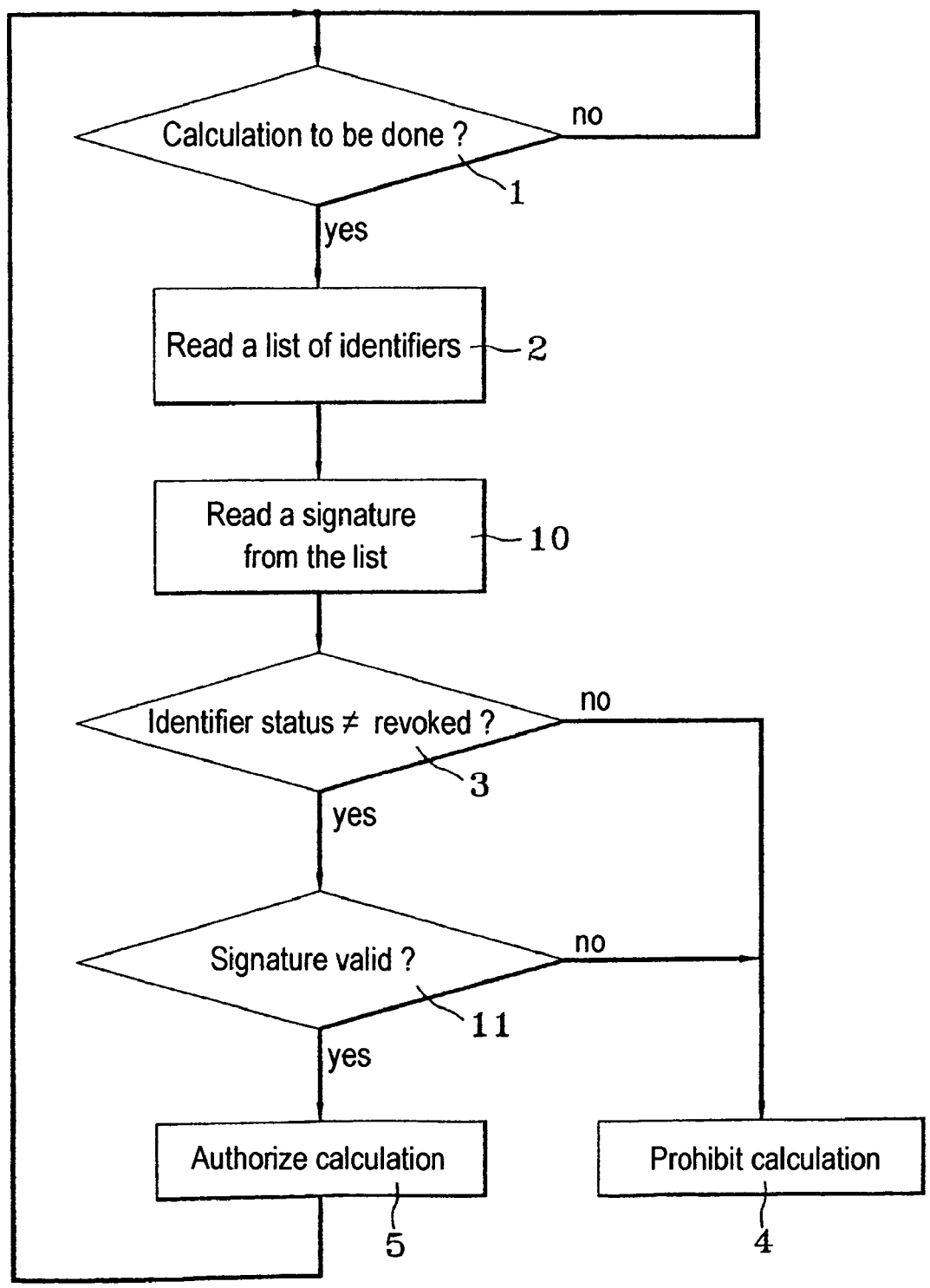
FIG. 2 is a flowchart of a first embodiment of a cryptographic method of the invention.

FIG. 2 shows a first embodiment of the cryptographic method of the invention. This embodiment comprises the steps described with reference to FIG. 1, which are not described again, and additional steps described hereinafter. At the same time as reading the list, and in the same memory area, the chip reads a signature from the list (operation 10). The signature is calculated beforehand by calculation means of the second entity. Before the chip authorizes calculation by the calculation means (operation 5), it verifies the validity of the signature in order to authenticate the list and to verify its integrity (operation 11). If the signature is not valid, the chip prohibits calculation by the calculation means (operation 4); otherwise it authorizes calculation (operation 5).

Figure 3:
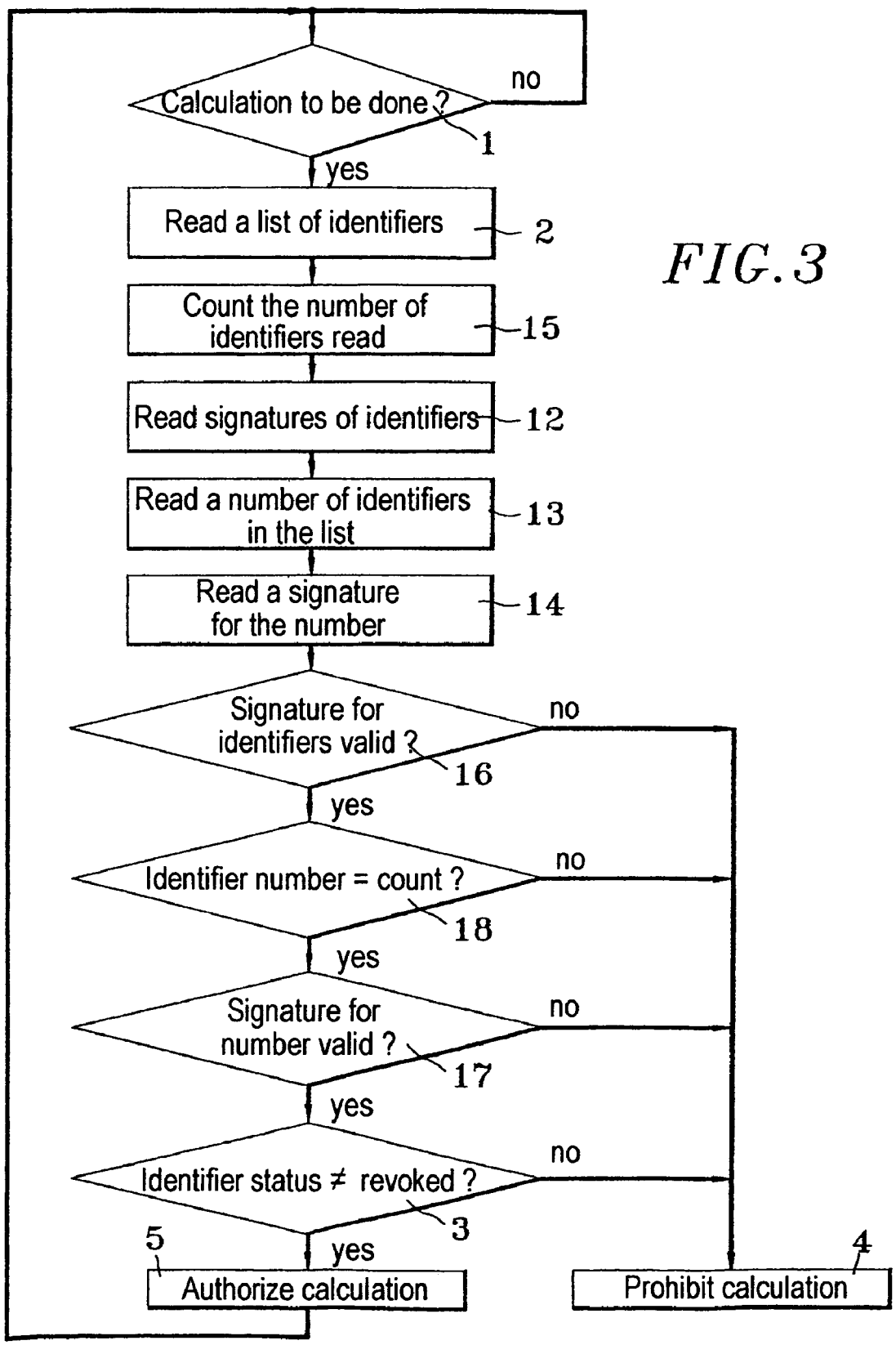
FIG. 3 is a flowchart of a second embodiment of a cryptographic method of the invention.

FIG. 3 shows a second embodiment of the cryptographic method of the invention. This embodiment includes the steps described with reference to FIG. 1, which are not described again, and additional steps described hereinafter. At the same time as reading the list, and in the same memory area, the chip also reads a count value associated with each identifier, a signature for each set, comprising an identifier from this list and an associated count value, the value of the number of identifiers in the list, and a signature for that value (operations 12, 13, 14). The signature for each identifier and the associated count value, the value of the number of identifiers, and the signature for that value are calculated beforehand by calculation means of the second entity and stored in the same memory area as the list. To count the number of identifiers, the chip increments a counter each time that the chip reads an identifier, taking account of the count value associated with the identifier (operation 15). Before the chip authorizes calculation by the calculation means (operation 5), it verifies the validity of each of the signatures to authenticate each identifier from the list and the number of identifiers, respectively (operations 16, 17). If any of the signatures is not valid, the chip prohibits calculation (operation 4).

Figure 4:
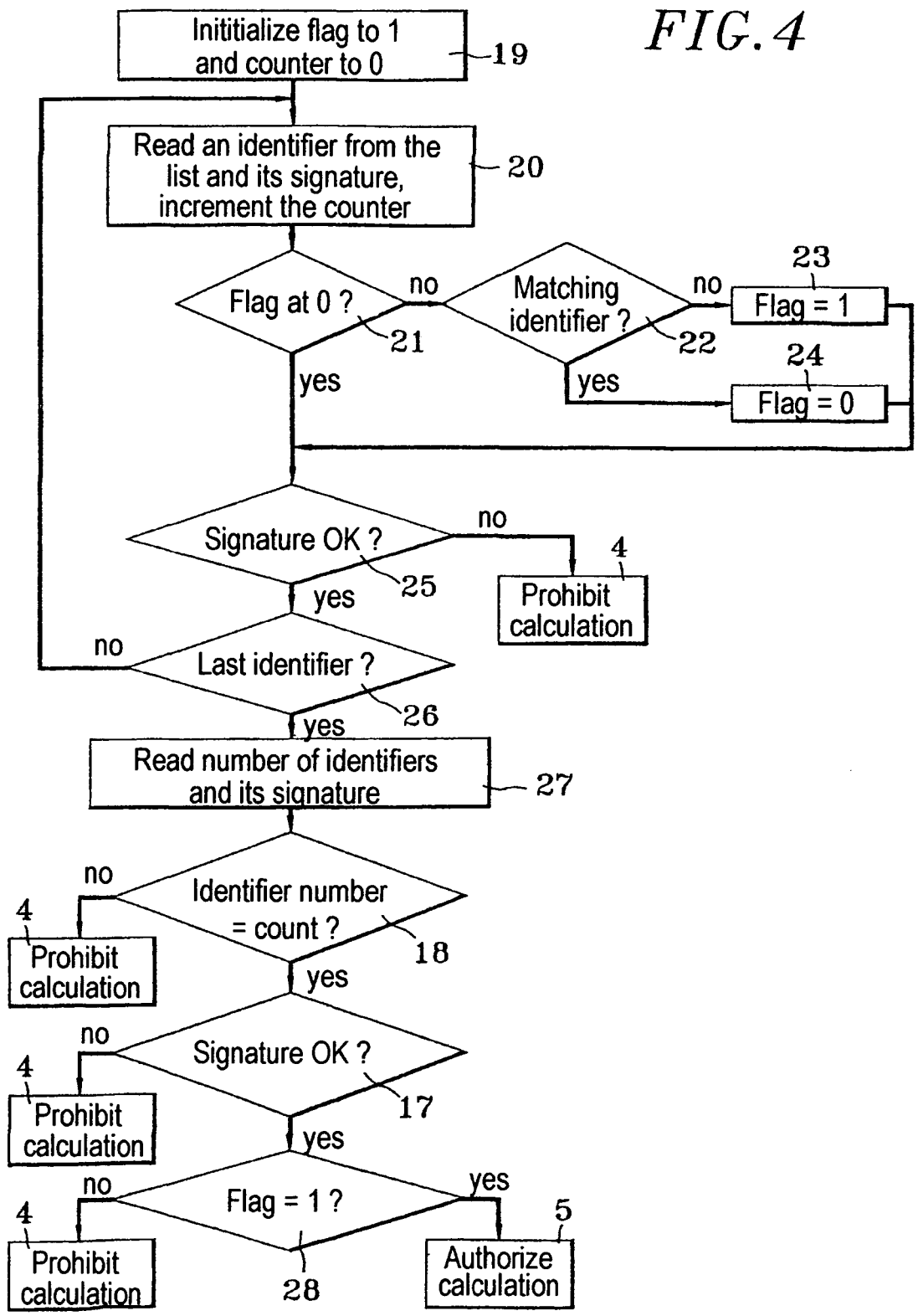
FIG. 4 is a flowchart of an example of the implementation by a chip of the second embodiment of a cryptographic method of the invention.

After reading the list of identifiers, the chip compares the value of its counter to the read value of the number of identifiers (operation 18). If these values are different, the chip prohibits calculation by the calculation means (operation 4). If these values are identical, the chip verifies the validity of the signature for the value of the number of identifiers (operation 17). FIG. 4 shows the use of this second embodiment by a chip. The chip initializes a flag to 1 and a counter to 0 (operation 19). The chip reads an identifier from the list, the associated count value, and their signature and increments the counter (operation 20). The chip compares the flag to 0 (operation 21). If the flag is not at 0, the chip compares the identifier read to the identifier stored in the chip (operation 22); if they are not identical, the chip sets the flag to 1 (operation 23); otherwise it sets the flag to 0 (operation 24). After comparing the read identifier and the identifier stored in the chip, or if the flag is at 0, the chip verifies the validity of the signature of the combination of the read identifier and the associated count value (operation 25). If the signature is not valid, the chip prohibits calculation by the calculation means (operation 4). But, if the signature is valid, the chip waits for the next identifier (operation 26) or, if there are no more identifiers in the list, the chip reads the value of the number of identifiers and its signature (operation 27). The chip compares the value of the number of identifiers with the value of its counter (operation 18). If these values are different, the chip prohibits calculation by the calculation means (operation 4); otherwise the chip verifies the validity of the signature of the value of the read number (operation 17). If the signature is not valid, the chip prohibits calculation by the calculation means (operation 4). If the signature is valid, the chip tests the value of the number of identifiers (operation 28). If the flag is not at 1, the chip prohibits calculation by the calculation means (operation 4), as this means that the member has been revoked. Otherwise, the chip authorizes calculation by the calculation means (operation 5).

Figure 5:
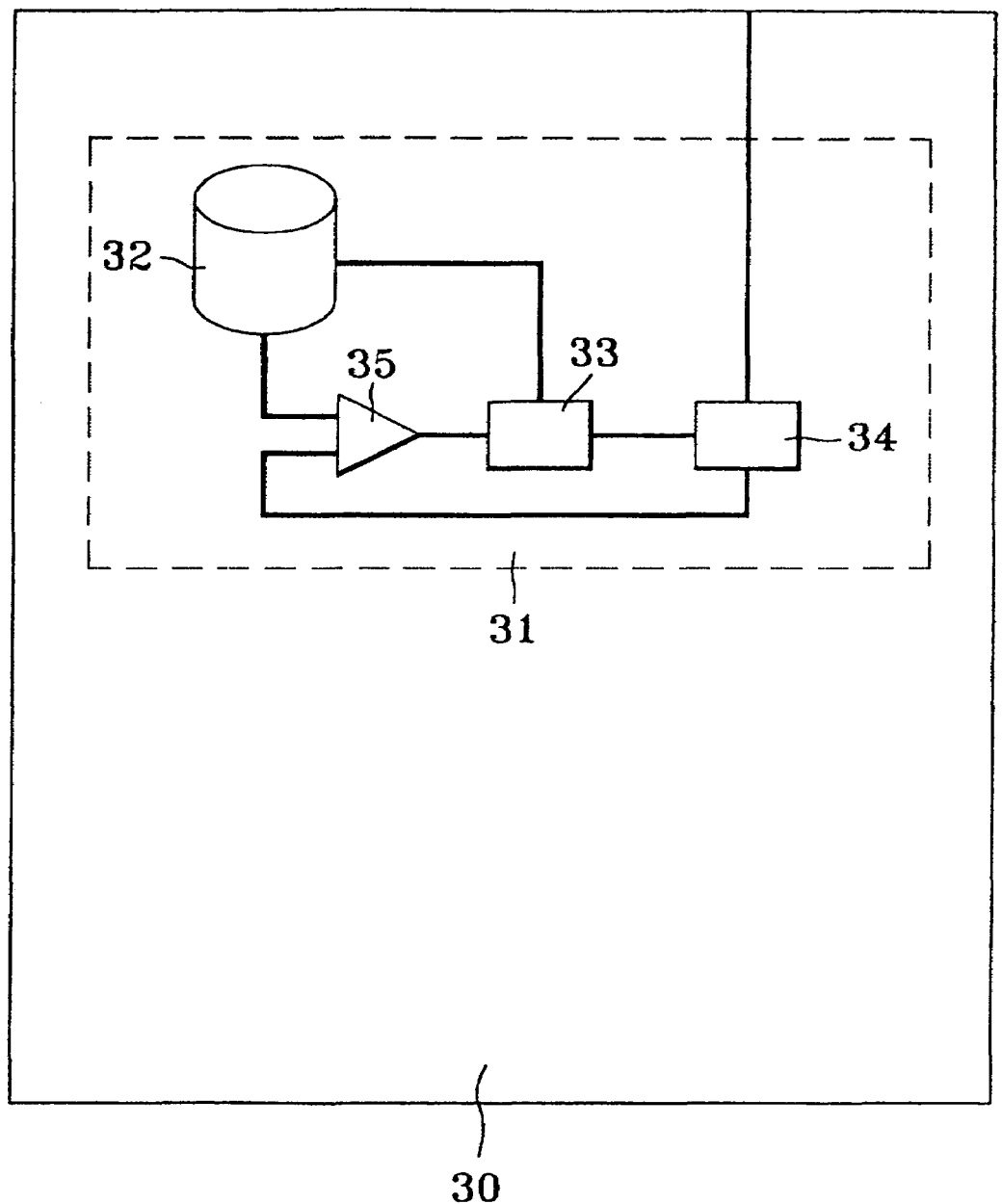
FIG. 5 is a diagram of a smart card of the invention.

FIG. 5 is a diagrammatic representation of a smart card of the invention.

The smart card 30 is equipped with a chip 31 which comprises storage means 32, calculation means 33, means 34 for reading storage means of a second entity via a telecommunications network, and means 35 for authorizing calculation by the calculation means.

The storage means 32 store a secret key and an identifier of a first entity, i.e. the proprietor of the smart card.

The calculation means 33 execute a cryptographic algorithm whose input arguments include the secret key. The calculation means 33 are connected to the storage means 32.

The reading means 34 are used to read a list of identifiers in the storage means of the second entity via a telecommunications network. The reading means 34 send the read data to the calculation means 33 and/or to the authorization means 35 via connections to each of those means.

The authorization means 35 authorize calculation by the calculation means 33 as a function of the results of comparing the identifier and the contents of the list.

A smart card 30 of the above kind is used to implement a method of the invention.

A first application of a method of the invention is to electronic voting, which comprises two phases:
  registration on an electoral list by an administrative authority, and
  voting using a ballot box connected via a communications network to a voting administration server.

When registering, the elector obtains in a smart card a personal private key and a group private key. The anonymous signature that the elector may produce using his smart card and his personal private key is referred to as "correlatable". This means that, if the elector attempts to sign a second voting slip anonymously by producing an anonymous signature, the slip is rejected by the ballot box. Because the anonymous signature is correlatable, the ballot box is able to verify that this is a second anonymous signature.

A malicious elector is not able to claim that he has lost his group private key and receive another one, and thus be in a position to vote twice. A method of the invention prohibits him from using the first group private key, as this group private key is updated when he declares that he has lost the first group private key. The loss of a group private key by a member is managed by a method of the invention in the same way as revocation of the member.

A second application of a method of the invention is to electronic bidding. Bidding involves three protagonists, namely a server, a trusted authority and a client. All clients form a client group. A user wishing to subscribe to a client group must contact the trusted authority, which supplies his personal private key in a smart card. He thus obtains the right to produce a group anonymous signature. Using this right, he is able to sign each of his bids anonymously. At the time of a bid for a certain product, each member of the client group may bid by signing a message containing in particular details of the product on sale and the amount of his bid. The bidding server is then able to verify that he belongs to the group, and thus that the bid is valid, by verifying the group anonymous signature. The winner is the person submitting the highest bid prior to adjudication. The last message received by the bidding server is therefore that from the winner. The server then sends this message and the corresponding group anonymous signature to the trusted authority, which alone is able to remove the anonymity and thus to determine the physical identity of the purchaser of the product bid for.

Bidding involves dynamic groups as new persons may be registered with the group every day and a member may leave the group or be excluded for fraud at any time. It is therefore essential to set up a revocation device to prevent a revoked member using his signature fraudulently. A revoked member could continue to use his group private key to bid and thus corrupt the bidding process, for example by upping the bidding. If he is careful to withdraw from the bidding process soon enough not to make the winning bid, the fraud will go undetected, since only the identity of the winner is finally revealed. A method of the invention solves the problem of revocation of one or more members of the group.

A third application of a method of the invention is to electronic payment. This involves four protagonists, namely a customer, a trader, a bank and a trusted authority. Each customer must identify himself to the system and obtain a group private key stored in a smart card before being able to carry out his first transaction. To make a payment, the customer must withdraw electronic "cash" from his bank. Thanks to the use of a blind signature scheme, the cash C he withdraws is anonymous. The cash C is spent in the following manner: using his smart card, the customer generates a group signature applying to the cash C and sends the combination of the signature and the cash C to a trader. The trader verifies the signature of the bank attached to the cash C and verifies the group signature. If each of the two signatures is valid, the trader accepts the transaction. At a given time of day, the trader sends his bank the signatures and cash received in payment, for transfer to his account. In the event of fraud, for example use of the same cash in multiple transactions, the bank sends the group signature applying to the contested cash to the trusted authority in order for it to identify and sanction the wayward customer.

A reliable mechanism for revoking keys that have been compromised is necessary to prevent fraud of the following type: a dishonest customer reports to the trusted authority the loss of his group private key s and thereby declines to accept any liability for fraud carried out using the key s. The customer hands his key over to an accomplice, who is then able to use the key s to sign cash c legitimately withdrawn from the bank and then spend the cash as many times as he wishes. A method of the invention solves the problem of revoking the keys S.

The invention claimed is:

1. A cryptographic method implemented by a smart card of a set of smart cards each belonging to a first entity that may be different for each smart card, each smart card comprising a chip comprising storage means for storing a secret key and an identifier of the first entity that is the proprietor of the smart card and calculation means for executing a cryptographic algorithm comprising input arguments comprising at least the secret key, the method comprising:
  reading by the chip from a storage means of a second entity a list of identifiers in complete form of first entities that are smart card proprietors before any calculation is made by the calculation means of the chip, said list of identifiers being linked to a status assigned to each of the first entities by the second entity; and comparing by the chip the identifier stored in the storage means of the chip and the contents of the list of identifiers to authorize or prohibit calculations made by the calculation means of the chip as a function of the result of the comparison;

simultaneous with reading the list of identifiers, reading by the chip signatures of each of the identifiers in the list of identifiers, a value of the number of identifiers in the list of identifiers, and a signature of the value from the storage means of the second entity, the signatures of each of the identifiers, the value, and the signature of the value having been previously calculated by a calculating means of the second entity;

verifying by the chip the validity of each of the signatures of the identifiers and counting by the chip the number of identifiers in the list of identifiers before authorizing by the chip any calculations by the calculation means of the chip; and verifying by the chip that the counted number of identifiers and the read value of the number of identifiers are the same before authorizing by the chip any calculations by the calculation means of the chip.

2. A cryptographic method according to claim 1, wherein the list comprises all first entities whose status has been set to "revoked" by the second entity and the chip authorizes calculation only if the identifier stored in the storage means of the chip is not in the list.

3. A cryptographic method according to claim 1, wherein the list comprises all first entities whose status has been set to "non-revoked" by the second entity and wherein the chip authorizes calculation only if the identifier stored in the storage means of the chip is in the list.

4. A smart card for implementing a method according to claim 1, the smart card comprising:

a chip comprising:

storage means for storing a secret key and an identifier of a first entity that is a proprietor of the smart card;

calculation means for executing a cryptographic algorithm comprising input arguments comprising the secret key;

reading means for reading from storage means of a second entity via a telecommunications network, a list in complete form of identifiers of first entities that are smart card proprietors, signatures of each of the identifiers in the list of identifiers, a value of the number of identifiers listed in the list of identifiers, and a signature of the value, said list of identifiers being linked to a status assigned to each of the first entities by the second entity, and the signatures of each of the identifiers, the value, and the signature of the value having been previously calculated by a calculating means of the second entity;

means for comparing the identifier stored in the storage means of the chip and the contents of the list of identifiers to authorize or prohibit calculation by the calculation means as a function of the result of the comparison;

means for verifying the validity of the signatures of the identifiers;

means for counting the number of identifiers in the list of identifiers;

means for verifying that the counted number of identifiers and the read value of the number of identifiers are the same; and means for authorizing calculation by the calculation means as a function of the result of the verification that the counted number of identifiers and the read value of the number of identifiers are the same.

5. An article of manufacture for use in a computer system, comprising a computer usable medium, for performing a cryptographic method implemented by a smart card of a set of smart cards each belonging to a first entity that may be different for each smart card, each smart card comprising a chip comprising storage means storing a secret key and an identifier of the first entity that is the proprietor of the smart card (30) and calculation means executing a cryptographic algorithm comprising input arguments comprising at least the secret key, wherein the computer usable medium comprises computer readable code for executing the steps of:

reading from a storage means of a second entity before any calculation by the calculation means of the chip a list of identifiers in complete form of first entities that are smart card proprietors, signatures of each of the identifiers in the list of identifiers, a value of the number of identifiers listed in the list of identifiers, and a signature for the value of the number, said list of identifiers being linked to a status assigned to each of the first entities by the second entity and the signatures of each of the identifiers, the value, and the signature of the value having been previously calculated by a calculation means of the second entity;

verifying by the chip the validity of each of the signatures of the identifiers and counting by the chip the number of identifiers in the list of identifiers before authorizing by the chip any calculations by the calculation means of the chip;

verifying by the chip that the counted number of identifiers and the read value of the number of identifiers are the same; and comparing by the chip the identifier stored in the storage means of the chip and the contents of the list of identifiers to authorize or prohibit calculations made by the calculation means as a function of the result of the comparison.

* * * * *